United States Patent [19]
Krepela

[11] Patent Number: 6,032,921
[45] Date of Patent: Mar. 7, 2000

[54] ENGINE SHUTDOWN VALVE

[75] Inventor: Joseph Krepela, Edmonton, Canada

[73] Assignee: Barber Industries, Inc., Calgary, Canada

[21] Appl. No.: 08/687,131

[22] Filed: Jul. 24, 1996

[51] Int. Cl.[7] ................................................ F16K 31/44
[52] U.S. Cl. .......................... 251/63.4; 251/74; 251/302; 251/367; 123/198 F
[58] Field of Search .................................. 251/63.4, 302, 251/74, 73, 68, 367; 123/198 F

[56] References Cited

U.S. PATENT DOCUMENTS

| 4,215,845 | 8/1980 | Sturgeon | 251/63 |
|---|---|---|---|
| 4,285,494 | 8/1981 | Sturgeon | 251/63 |
| 4,537,386 | 8/1985 | Krepela | 251/302 |
| 5,203,536 | 4/1993 | Krepela | 251/74 |
| 5,205,252 | 4/1993 | Krepela | 123/198 D |

FOREIGN PATENT DOCUMENTS 1 178 862  7/1996  Canada .

Primary Examiner—A. Michael Chambers
Attorney, Agent, or Firm—John Russell Uren

[57] ABSTRACT

An engine shutdown valve comprises a housing and a gate movable within a housing between a first position where the air flow through the shutdown valve is substantially unrestricted to a second position where the opening is restricted thereby stopping air flow. The gate is pivotable about an axis. The gate has an extension with a recess which is engageable by a piston movable between a first position where the gate is held in its latched position and a second position out of engagement with the recess so as to allow the gate to move to a position where the air passageway is closed. The gate is movable by a rod attached to the gate lever and which rod is biased by a compression spring mounted within a sleeve. The spring is adjustable to increase or decrease the force on the gate and such adjustment can be accomplished from outside the shutdown without disassembly of the entire valve.

8 Claims, 3 Drawing Sheets

FIG. I

ENGINE SHUTDOWN VALVE

INTRODUCTION

This invention relates to an engine shutdown valve and, more particularly, to an engine shutdown valve of unique configuration used to terminate engine operation.

BACKGROUND OF THE INVENTION

Engine shutdown valves are well known in the diesel engine industry. Such valves are used to terminate the operation of a diesel engine when overrevving results from combustible vapours being present in the atmosphere in which such engines are operated or when other mechanical failures may occur or be imminent. By terminating atmospheric or air flow through the intake manifold in which combustible vapours are present, the engine will starve from lack of oxygen and the engine will shutdown thereby preventing damage to the engine caused by overrevving. Such engine shutdown valves are, for example, disclosed in our U.S. Pat. Nos. 4,215,845, 4,285,494, 4,537,386 and 5,203,536.

In U.S. Pat. No. 5,203,536, there is disclosed an engine shutdown valve which utilises a tension spring to close the gate to which it is attached and to thereby terminate air flow through the intake manifold of the engine. However, when the gate is in its usual open position, the tension spring was fully extended and, in this extended position, it was vulnerable to engine vibration. This was disadvantageous. A further disadvantage in the valve disclosed in the aforementioned '536 patent is that the tension spring was not accessible from the outside of the housing of the shutdown valve. The shutdown valve was required to be completely disassembled to obtain access to the tension spring for replacement or adjustment.

SUMMARY OF THE INVENTION

According to the invention, there is provided an engine shutdown valve comprising a housing, a gate within said housing and being pivotable about a gate axis, a substantially unobstructed full bore air flow passage extending through said housing and having a longitudinal axis parallel to said gate axis, a first compression spring operably mounted so as to bias and move said gate from a first position wherein said air flow passage is substantially unobstructed to a second position wherein said air flow passage is closed and a piston assembly having a spindle operably acting on said gate, said spindle having a first gate retaining position in which said gate is retained in said first position and a second gate release position out of engagement with said gate when said gate is in said second position, said spindle operably acting to release said gate when said spindle moves from said first retaining to said second release position.

BRIEF DESCRIPTION OF THE SEVERAL VIEWS OF THE DRAWINGS

An embodiment of the invention will now be described by way of example only, with the use of drawings in which.

DESCRIPTION OF SPECIFIC EMBODIMENT

Figure 1:
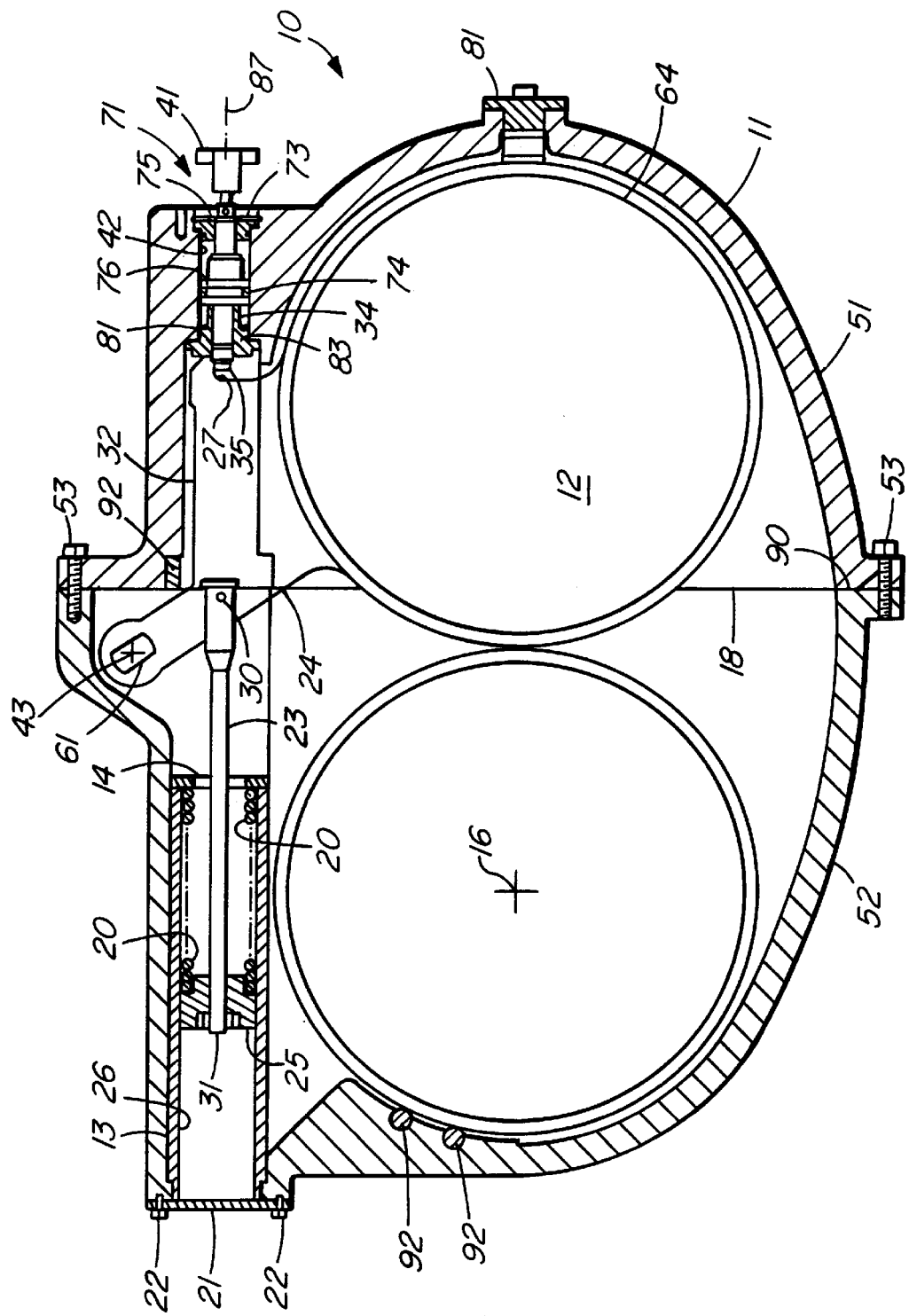
FIG. 1 is a sectional side view of the engine shutdown valve according to the invention.

Referring now to the drawings, an engine shutdown valve according to the invention is generally shown at 10 in FIG. 1. The engine shutdown valve 10 comprises a housing generally shown at 11 and a gate generally shown at 12.

A sleeve 13 is positioned within the housing 11 and a stop plate 14 closes the end of sleeve 13. A compression spring 20 is positioned within the sleeve 13 between the stop plate 14 and a spring retainer 25 which is movable within sleeve 13. The opening 26 in which sleeve 13 is mounted is closed at its leftward end by a cap 21 which is connected to the housing 11 by cap screws 22.

The housing 11 comprises two halves 51, 52 the halves being connected together with cap screws 53. Housing half 52 has an unobstructed passageway 54 (FIG. 2) extending therethrough, the axis 16 of which is parallel with the axis 43 about which gate 12 pivots. The housing halves 51, 52 are joined together along a plane 18 which plane 18 is parallel to axis 16 of air passageway 54. Housing half 51 includes the recess for the gate in a first position where the passageway 54 is unobstructed and where the gate 12 assumes its "latched" or retained position.

A rod 23 is connected at one end to the lever 24 of the gate 12 by a pin 30 and at the other end, which end is threaded by a nut 31 which seats on the spring retainer 25 and which is rotatable relative to the rod 23 in the seat of the spring retainer 25.

Spring retainer 25 is movable within sleeve 13 and is biased leftwardly as viewed in FIG. 1 by the action of the compression spring 20 within sleeve 13 between the stop plate 14 and the spring retainer 25.

The gate lever 24 and gate 12 also include an extension 32 which moves with the gate lever 24 and gate 12. Extension 32 has a latch area 27 (FIG. 3) which contacts the end 35 of a spindle 34 as will be more clearly described hereafter.

The gate lever 24 is held about pivot axis 43 by an operating shaft or drive 44 (FIG. 2). operating shaft 44 extends through an opening in the rear of housing half 52, through gate lever 24 of gate 12 and out an opening 60 of smaller diameter in the forward face of housing half 52. Operating shaft 44 has a milled flat portion 61 thereon which engages with a complementary parallel slot on gate lever 24. Drive 40 thereby rotates with gate 12, gate lever 24 and extension 32. A first O-ring 62 is positioned about operating shaft 44 in housing half 52 and a second O-ring 63 is positioned about operating shaft 44 in housing half 52 in the forward opening 60 in housing half 52. A snap ring (not illustrated) is connected to operating shaft 44 to retain it within the housing half 52 and to allow rotation of the operating shaft 44 within housing half 52.

Figure 2:
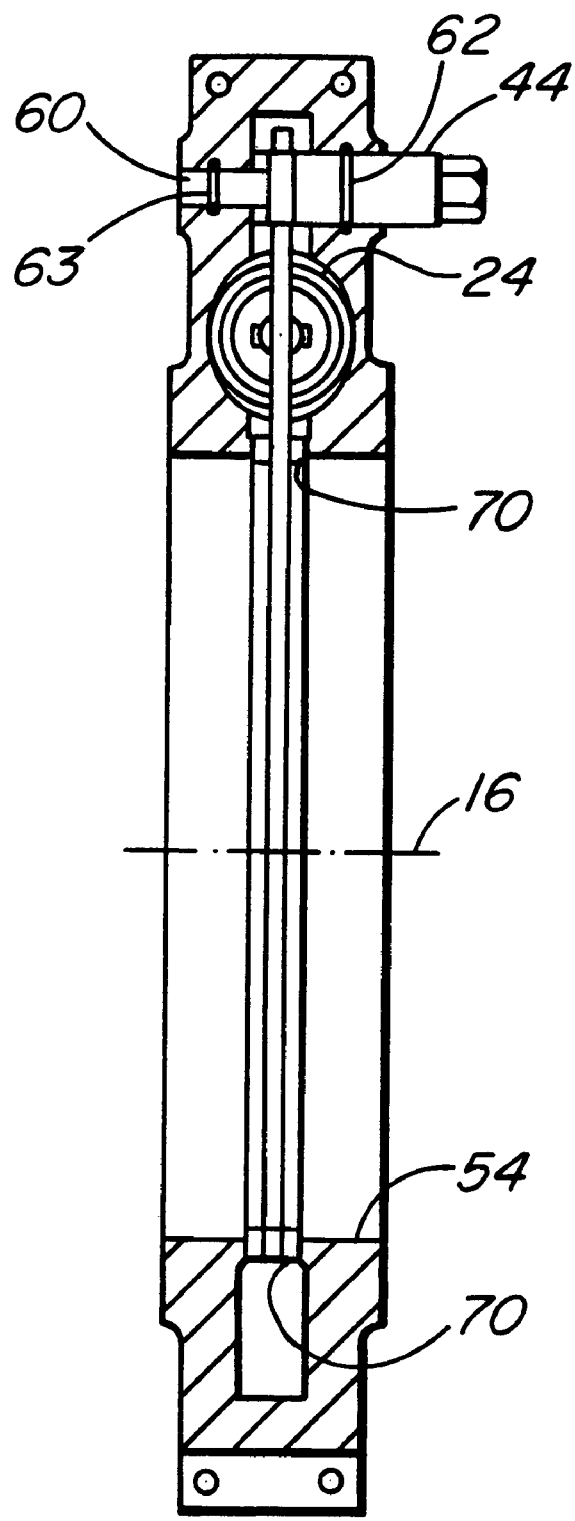
FIG. 2 is an end sectional view of the engine shutdown valve of FIG. 1 taken along II—II of FIG. 1.

Gate 12 has a vulcanized rubber seal or a mechanically attached TEFLON ring 64 mounted on opposite sides of the gate 12. In the closed position, the seal or ring 64 contacts the machined edges 70 of housing half 51 as illustrated in FIG. 2. In the open or latched position, the gate 12 is a loose fit within the right housing 51.

Figure 3:
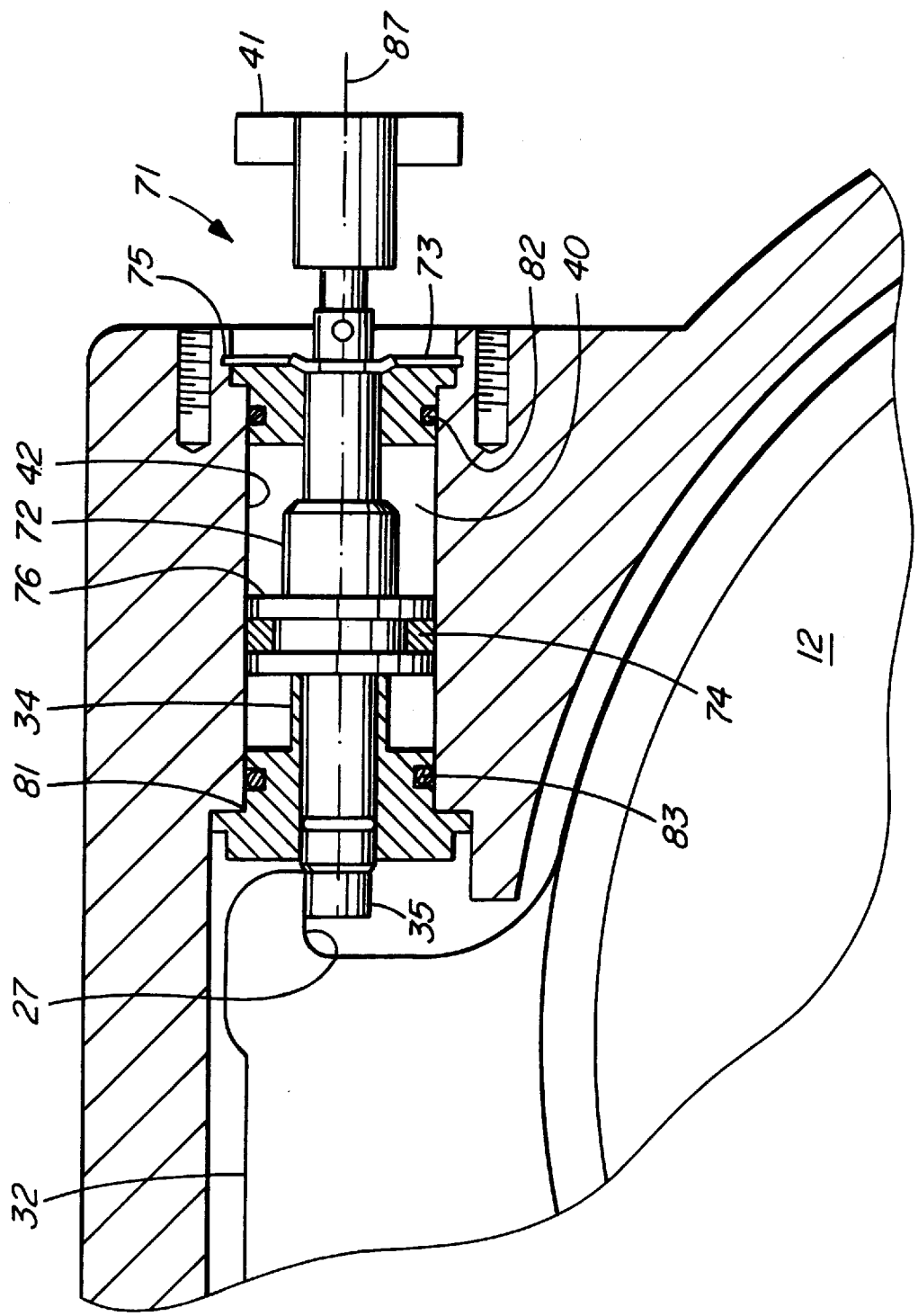
FIG. 3 is an enlarged sectional view of the area of the housing illustrating the latching action of the piston assembly.

Referring now to the piston assembly generally illustrated at 71 and shown in greater detail in FIG. 3, a handle 41 assembly is mounted to the end of the piston 72. An end plate 73 extends about the piston 72 of the piston assembly 71 adjacent the outside of housing half 51 and is held in place in snap-ring 75. A U-cup 74 is mounted about the piston 72 and a compression spring 40 is mounted between the end plate 73 and a collar 76 of the piston 72 to exert pressure on the piston assembly 71 and thereby bias it into contact with the latch area 27 of the gate lever extension 32 or leftwardly as viewed in FIGS. 1 and 3. A spindle bearing 81 is mounted in the piston assembly recess 42 and an O-ring 83 extends between the spindle bearing 81 and the housing half 52. An O-ring 82 is mounted between the end plate 73 and the inside of the piston assembly recess 42. The spindle portion 34 of the piston assembly 71 has a cylindrical head 35 which is complementary to the shape of the gate extension 32 where the latching action occurs, i.e., latch area 27. Piston assembly 71 reciprocates along axis 84 so as to move in and out of contact with the latch area 27 of extension 32 as will be explained in greater detail hereafter.

A support 91 (FIG. 1) is positioned in housing 51 to support the gate 12 in its open or latched position by way of a ridge (not shown) that falls within the gate 12, when gate 12 is in its latched position. Likewise, a guide 92 similarly supports the gate 12 in its latched position, the guide 92 having a receiving area that allows the entrance of the gate lever 27 and extension 32. The purpose of support 91 and guide 92 is to reduce or eliminate any vibration of the gate 12 during its latched retaining position.

Bumpers 92 serve as shock absorbers to reduce the impact of the gate 12 when it is released by the piston assembly 71 and moves to its closed position.

OPERATION

In operation, the engine shutdown valve 10 is installed in the intake manifold or intake system of a diesel engine (not shown) with the unobstructed passageway being positioned so as to be coaxial with the passage of the intake system. Operating drive 44 must be rotated manually and gate 12 and extension 32 will rotate as operating drive 44 is rotated until the extension 32 contacts the head 35 of spindle 34 and moves it rightwardly until the head 35 can enter the latch area 27 of extension 32, the piston assembly 71 being biased leftwardly under the influence of compression spring 20. The gate 12 is then retained in its latched position as illustrated in FIG. 1 leaving passageway 54 unobstructed. Compression spring 40 will bias the gate 12 leftwardly or towards its second position where the passageway 54 is totally obstructed.

When an overrevving condition is noticed and when the engine operation wishes to be terminated by an operator, the handle 41 is pulled by the operator rightwardly as viewed in FIGS. 1 and 3. The head 35 of spindle 34 will thereby move out of the latched area 27 of extension 32 with the result that the gate 12 and the gate lever 24 will immediately rotate clockwise about axis 43 under the influence of compression spring 20 and rod 23 to the second or tripped position where the passageway 54 is completely obstructed. This will terminate air flow through the engine and the engine will shut down. When the condition that gave rise to the over-revving condition is corrected, the operating shaft 44 is again manually rotated to open the gate 12 as earlier described and the engine shutdown valve is in its latched condition and ready again for operation.

It will be noted that sleeve 13 is accessible by the removal of cap 21 and that nut 31 is rotatable to increase or decrease the force in the compression spring 20 and, thereby, on rod 23. Thus, the entire valve need not be disassembled to obtain access to the spring 20 and to sleeve 13 which may be removed for servicing as well.

While the release operation of the gate 12 by the spindle 34 is described as being a manual operation, by pulling on handle 41, it is also contemplated that the release operation could be achieved by having a trip cylinder which could be signaled pneumatically or hydraulically or, alternatively, by utilizing an electric solenoid which is attached to the end of the spindle.

Many further embodiments of the invention will readily occur to those skilled in the art to which the invention relates and the specific embodiments described herein should be taken as illustrative of the invention only and not as restricting its scope as defined in accordance with the accompanying claims.

The embodiments of the invention in which and exclusive property of privilege is claimed are defined as follows:

1. An engine shutdown valve comprising a housing, a gate within said housing and being pivotable about a gate axis, a substantially unobstructed air flow passageway extending through said housing and having a longitudinal axis parallel to said gate axis, said housing comprising two halves joined together along a plane, said plane between said housing halves being parallel to said longitudinal axis of said air passageway, a first compression spring operably mounted so as to bias and move said gate from a first position wherein said air passageway is substantially unobstructed to a second position wherein said air passageway is closed and a piston assembly having a spindle operably acting on said gate, said spindle having a first gate retaining position in which said gate is retained in said first position and a second gate release position out of engagement with said gate when said gate is in said second position, said spindle operably acting to release said gate when said spindle moves from said first retaining to said second release position.

2. An engine shutdown valve as in claim 1 wherein said compression spring is operable on a rod, said rod being biased by said compression spring to move said gate from said first to said second position.

3. An engine shutdown valve as in claim 2 wherein said gate has an extension, said extension contacting said spindle when said gate is in said first position, said spindle being movable out of contact with said extension when said gate is in said second position.

4. An engine shutdown valve as in claim 3 wherein one end of said rod is pivotally connected to said gate lever and the other end of said rod is retained in a spring retainer, said spring retainer being slidable within a sleeve under the influence of said compression spring, said compression spring being positioned between a stop plate in said sleeve and said spring retainer, said spring retainer moving relative to said stop plate when said gate moves from said first retaining to said second position.

5. An engine shutdown valve as in claim 4 wherein the end of said rod within said spring retainer is threaded, said threaded end of said rod being connected to a nut, said nut being adjustable relative to said rod to increase and decrease the force in said compression spring by moving said spring retainer relative to said stop plate.

6. An engine shutdown valve as in claim 5 wherein said sleeve is operably mounted within an opening in said housing and wherein said opening is closed by a removable cap assembly on the outside of said housing.

7. An engine shutdown valve as in claim 6 and further comprising a support for said gate, said support being mounted in said housing and being operable to contact said gate when said gate is in said latched position.

8. An engine shutdown valve as in claim 7 and further comprising a bumper in said housing, said bumper being operable to contact said gate when said gate moves to said second position.

* * * * *